July 31, 1951      R. H. DORF      2,562,179
MULTIQUESTION QUIZ GAME AND SCORING DEVICE
Filed Aug. 11, 1948      3 Sheets-Sheet 2
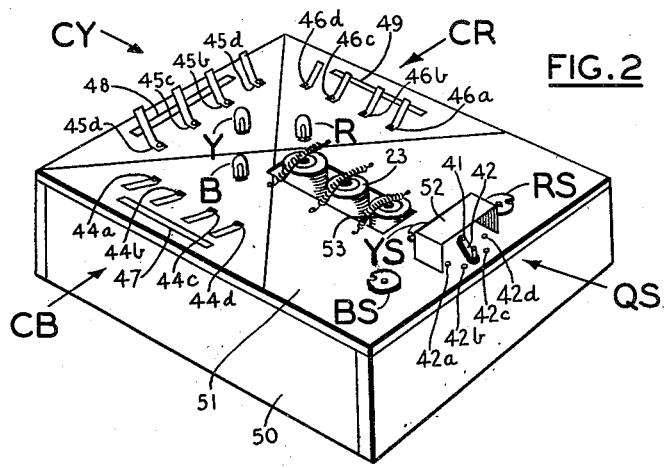
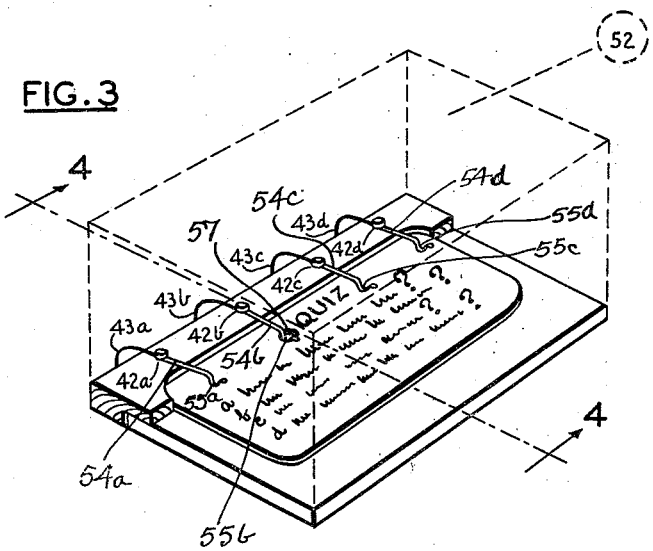
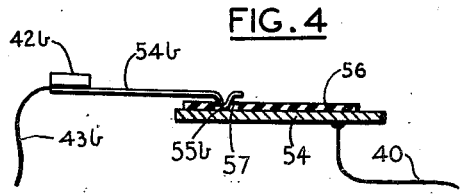
INVENTOR.
RICHARD H. DORF
BY July 31, 1951 R. H. DORF 2,562,179
MULTIQUESTION QUIZ GAME AND SCORING DEVICE
Filed Aug. 11, 1948 3 Sheets—Sheet 3

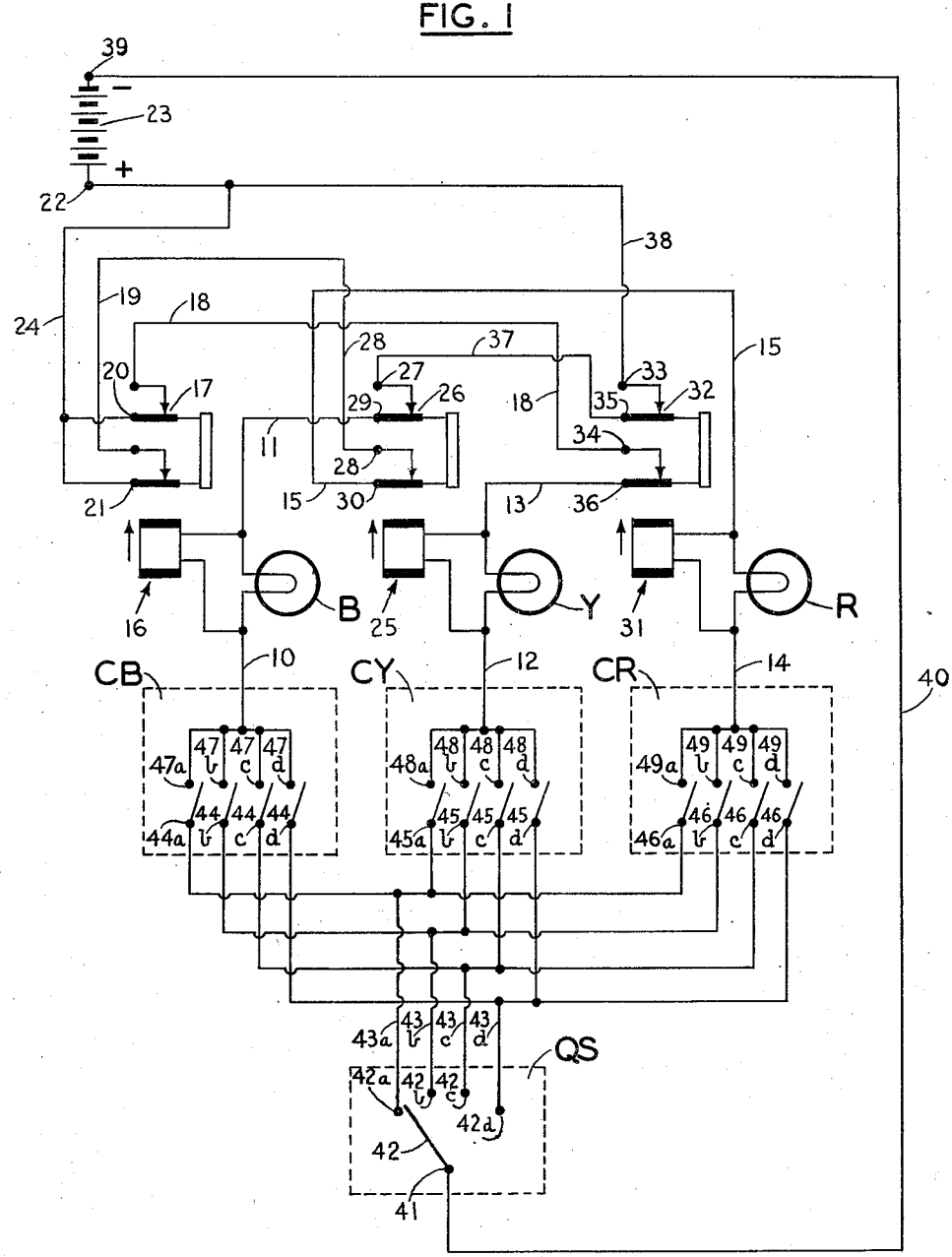

*INVENTOR.*
RICHARD H. DORF
BY
*his attorney*

Patented July 31, 1951

2,562,179

UNITED STATES PATENT OFFICE 2,562,179

MULTIQUESTION QUIZ GAME AND SCORING DEVICE

Richard H. Dorf, New York, N. Y.

Application August 11, 1948, Serial No. 43,575

5 Claims. (Cl. 35—48)

1

This invention relates to a quiz game and more particularly to a multi-question quiz game, and still more particularly to a scoring device for judging contestants' answers.

It is an object of my invention to provide a device for judging contestants' answers wherein the element of time for answering with relation to another constestant is a factor for consideration.

More specifically, it is an object of my invention to provide a scoring device which may be employed in the form of a game whereby a plurality of contestants are afforded the opportunity to manually indicate their answers by actuation of a signalling device which, in point of time, serves to cut out or render inoperative the signalling device of another contestant, if simultaneous action is not secured.

Still more particularly, it is an object of my invention to provide a scoring device for judging the answers of contestants to multiple choice questions not only to determine the accuracy of answer but also to judge, in point of time, the order of answering.

Still more particularly, it is an object of my invention to provide a game wherein multiple choice questions are presented to a group of contestants and a quiz master or control device predetermines the actuation of signalling means whereby contestants may actuate signalling means only where the correct answer has been selected, and still more particularly, to determine, by signalling means of a contestant, the first contestant effecting the correct selection of answer and the actuation of the signalling means indicates such selection.

Thus it is an object of my invention to provide a game or scoring device in which a group of contestants are examined for reaction time testing, as well as for correctness of selection of answers to multiple choice questions.

To attain these objects and such further objects as may appear herein, or be hereinafter pointed out, I make reference to the accompanying drawing forming a part hereof, in which—

Figure 1 is a wiring diagram illustrating one form of my device;

Figure 2 is a perspective view illustrating the association of the elements therefor;

Figure 3 is a magnified perspective veiw of an automatic control;

Figure 4 is a section taken on the line 4—4 of Figure 3;

Figure 5:
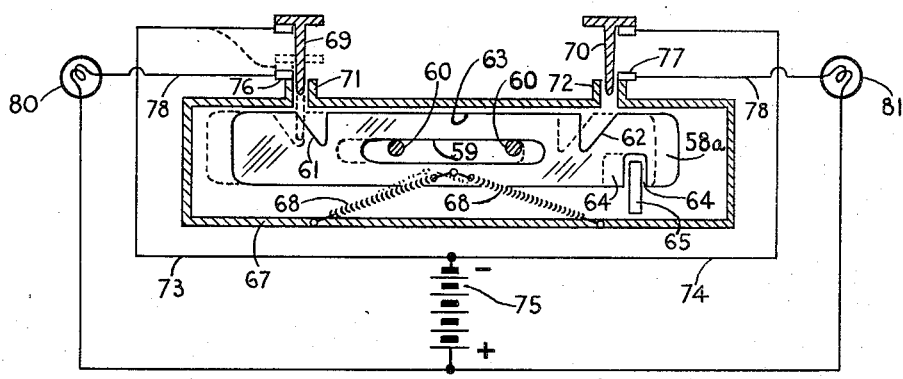
Figure 5 is a sectional diagrammatic view of another embodiment of my invention.

Making reference to the drawings, my device contemplates the provision of a scoring device for judging contestants to whom a choice of answers may be presented in a manner now referred to as multiple choice questions. The contestants have the option of scoring which of the questions are true or false, or selecting which of a plurality of probable answers is the correct one. While scoring of this character is known to me, it is contemplated by me to secure a device for scoring the accuracy of the answer as well as the reaction time with regard to another contestant.

Accordingly, I have provided a device in the form of a game wherein a plurality of contestants may manually actuate a signalling device with as many possible points of selection as will conform to the multiple choice questions. Thereupon a predetermination of the correct answer by a control, whether manual or automatic, will leave it to the contestant to signal the answer and with regard to other contestants, the actuation of the correct signal will block out or render inoperative, the ability to actuate the signal by the control means available to other contestants.

In its more specific embodiments, I provide a plurality of signals B, Y and R, each of which has pairs of conductors 10 and 11, 12 and 13, 14 and 15, respectively. The lamp B has connected in parallelism with it the relay 16 which actuates the double pole, single throw contact switch 17, connecting the fixed contacts thereof with the conductors 18 and 19, and connecting the movable part contacts through the terminals 20 and 21, to one terminal 22 of a source of power, such as the battery 23 through the conductor 24.

The lamp Y has in parallelism with it the relay 25, which actuates the double pole, single throw contact switch 26 connecting the spaced contacts thereof with the terminals 27 and 28. The movable terminal 29 is connected with the conductor 11. The movable part terminal 30 is connected with the line 15.

The lamp R has connected with it in parallelism the relay 31, which actuates the double pole, single throw contact switch 32, connecting the fixed contacts thereof with the terminals 33 and 34, and connecting the movable part contacts with the terminals 35 and 36, respectively. Terminal 35 is connected to terminal 27 by the conductor 37. Terminal 36 is connected to the conductor 13. Terminal 33 is connected to the battery terminal 22 by the conductor 38. Terminal 34 is connected to the conductor 18. Battery terminal 39 is connected by the conductor 40 to the terminal 41 of a master switch 42, which may make contact with any one of the terminals 42a, 42b, 42c or 42d, or alternatively the terminal 41 may be connected with a plurality of the manually operable switches as shown for each contestant.

The combination of manually controllable switches just described may be referred to as the quiz master station QS.

Conductors 43a, 43b, 43c and 43d connect the terminals 42a, 42b, 42c and 42d in parallelism with the terminals 44a, 44b, 44c and 44d; 45a, 45b, 45c, 45d; and 46a, 46b, 46c and 46d, each carrying manually operable switches for the corresponding terminals 47a, 47b, 47c and 47d; and 48a, 48b, 48c and 48d; 49a, 49b, 49c and 49d. The assembly of switches 44a—d, and 47a—d may be referred to as contestant's station CB; the assembly of switches 45a—d and 48a—d may be referred to as contestant's station CY; the assembly of switches 46a—d and 49a—d may be referred to as contestant's station CR. Contestant's station CB is connected to the line 10; contestant's station CY is connected to the line 12; contestant's station CR is connected to the line 14, by the assembly as shown.

Making reference to Figure 2, I have shown the assembly diagrammatically illustrated in Figures 1 and 2 wherein the entire assembly is shown mounted within a container 50 which has a panel 51 supporting the contacts for the stations QS, CB, CY, CR. A shield 52 obscures the switch 42 from all sides except one. The panel 51 has visible therethrough the batteries 23 which are held down by connectors 53, to connect the batteries in series, as will be readily understood. The connectors 53 comprise coiled springs which both mechanically and electrically connect the batteries in series, as described.

With the assembly as provided, the operation of the device as a game will now be described: The quiz master has under his control a series of multiple choice questions A, B, C and D. He propounds the questions to the contestants, each of whom has designated to him stations CB, CY or CR and who may manually operate one bank of a multiple number of switches 44a—d at station CB; 45a—d at station CY; 46a—d at station CR. The quiz master being apprised of the correctness of questions A, B, C or D moves the switch 42 to contact 42a, 42b, 42c or 42d. He thereupon audibly asks the questions of the contestants. The contestant first to manually actuate the correct switch at his station will actuate the relay 16, 24 or 31. The first relay which is actuated illuminates the corresponding lamp or signal B, Y and R. The actuation of one relay, such as 17, "locks out" the actuation of relays 25 and 31 as the actuation of one relay breaks the circuit for the lamps of the other two circuits.

Specifically, let us assume that the quiz master asks a multiple choice question in which one of the alternatives A, B, C or D is correct and the quiz master knows that A is correct. The quiz master thereupon moves the switch 42 to the 42a contact. Terminals 44a, 45a, 46a connected in parallelism by the line 43a, are thereupon connected with the line 40 to the lines 10, 12 and 14 only when the switch 44a, 45a or 46a is closed. The first contestant to manually actuate the switch 44a, 45a or 46a will therefore connect the bulbs B, Y or R if he selects the correct answer.

Should the contestant at station CB first close the switch 44a, the lamp B will become illuminated, as will also thus become activated the relay 16. The movement of the switches controlled thereby will break the circuit for the bulbs Y and R and these bulbs will not become illuminated, even if the contestants at stations CY and CR should likewise select the switches 45a and 46a, respectively.

From the above, it will be observed that the multiple switches selected will only illuminate the signalling means B, Y and R if the correct answer is selected and likewise, the first to select and manually operate the correct switch will render inactive the manually operable switches by the contestants at the other stations. The exception, however, will be in the event of a simultaneous operation of the correct switch by more than one contestant. Scores BS, YS and RS record the wins by each contestant.

It will thus be observed that I have provided a scoring device where, when contestants are given the opportunity of selecting the answer to a multiple choice question, the one first in point of time to select the proper answer may operate one of correspondingly numbered switch elements, to actuate a signal and such precedence in point of time with regard to the other contestants, renders the signalling means of the other contestants inoperative.

While I have described the operation of the device shown in Figures 1 and 2 by a manual positioning of the switch 42 to make contact with any one of the contacts 42a, 42b, 42c or 42d, I contemplate by my invention to provide an automatic closing of the switch corresponding to a correctly selected answer.

In Figure 3, I have shown diagrammatically means whereby the quiz master is relieved of the necessity for closing the proper circuit and automatic closing of the circuit will lay the basis for the selection of the proper answer, as obtained by connecting a plate 54 with the conductor 40. Each of the positions corresponding to the terminals 42a, 42b, 42c and 42d is provided with spring pressed contacts 54a, 54b, 54c, 54d, normally resiliently urging camming heads 55a, 55b, 55c, 55d carried thereby against the plate 54. With such construction, the quiz master is provided with a series of cards made of insulating material. One of these cards 56 is illustrated. On this card may be printed the multiple choice questions. The card also carries an electrical circuit shorting segment 57, such as an aperture through the card spacially placed with regard to the various positions of the contacts 54a, 54b, 54c and 54d.

The quiz master, after orally asking the question, pushes the card 56 into position with relation to the four contacts. The contact corresponding to the correct answer will be "shorted" to the plate 54 through the aperture 57, cutting out by insulation all other contacts. By this method, the quiz master's conscious efforts to close the proper switch may be eliminated. I may by this method likewise have a contacting plug which is not discernible by the quiz master, thereby to obscure from the quiz master himself the correct answer.

Figure 6:
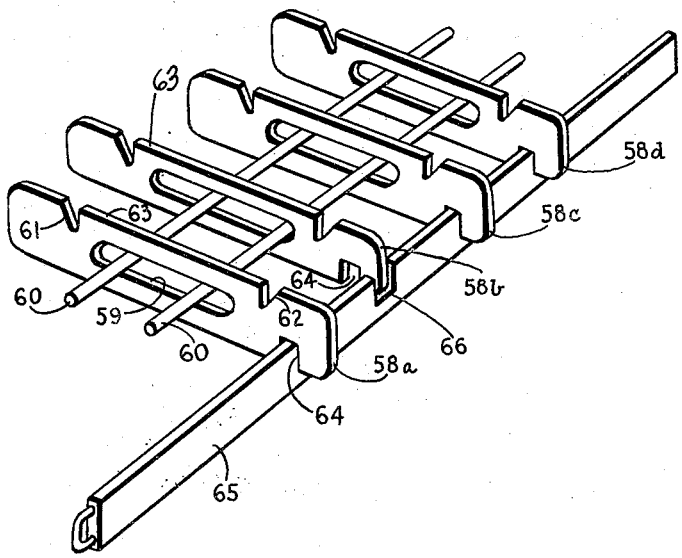
Figure 6 is a fragmentary perspective view of the operating mechanism.

While I have disclosed as the means for signalling illuminated devices with relays to cut out the actuation of the signalling means by the more tardy contestants, including relay circuits for this purpose, it is contemplated by me, as shown in Figures 5 and 6, to have a signalling means which mechanically cuts out the operation of a signalling means for the more tardy contestants by the earlier operating contestant.

In the embodiment illustrated in Figures 5 and 6, slides 58a, 58b, 58c, 58d are provided with guide slots 59, mounting the slides upon guide rods 60. The slides 58a, 58b, 58c, 58d have opposed camming slots 61 and 62, and abutment edges 63. Slides 58a, 58b, 58c, 58d each have slots 64 which ride over the stop rod 65 common to all slides. The stop rod has one slot 66, of a depth to permit a slide to pass thereover. It will be observed by this construction that when the cutout 66 is aligned with any of the slides 58a, 58b, 58c, 58d, sliding movement may be imparted to the slide which is aligned with the slot 66, but ordinarily no movement can be given to the slides by reason of the locking action of the slots 64 and the lock bar 65.

In Figure 5 I have diagrammatically illustrated the mounting of the slides thus described within a container 67, springs 68 holding the slides spring biased against displacement from the normal position. Plungers 69 and 70 are provided in position and spaced corresponding to the leading edge of the cams 61 and 62 operating through apertures 71 and 72 serving as plunger guides.

The plungers 69 and 70 are each connected by the conductors 73, 74 to one terminal of a battery 75. The shanks of the plungers 69 and 70 at the lowermost portion have complemental contacts 76 and 77, each connected by the conductors 78 and 79 to the lamps 80 and 81.

The embodiment illustrated in Figures 5 and 6 mechanically serves to provide means for closing the lamp circuit 80 and 81 by pressing down either of the plungers 69 or 70. The first plunger to be actuated engages the camming slot 61 or 62. Such camming action is possible for the slides 58a, 58b, 58c, 58d only when the quiz master has moved the lock bar 65 to a predetermined position. The first contestant operating the plunger 69 or 70 to depress the proper one serves to move this slide and bring the edge 63 opposite the opponent's plunger, to lock the plunger against downward movement. The device therefore mechanically makes possible the closing of one lamp circuit and the locking out of the other contestant's lamp circuit.

While I have described and illustrated in Figures 5 and 6 an arrangement where a pair of contestants may operate the plungers 69 and 70, it will be understood that by increasing the number of plungers and correspondingly increasing the number of camming slots more than two contestants may operate the sliders 58a, 58b, 58c and 58d.

Thus I have provided both mechanically and electrically a game scoring device for judging contestants' answers to multiple choice questions in point of time so that accuracy as well as priority of answering questions may be determined, and a plurality of signalling means may be actuated by contestants.

Having thus described my invention and illustrated its use, what I claim as new and desire to secure by Letters Patent, is:

1. In a game scoring device for judging contestants' answers to multiple choice questions in point of time as well as accuracy, the combination which includes a plurality of signalling means each having manual operable control means under the control of contestants at spaced stations, and each control at such station having a multiple choice selection means by said manually operable means, and separate means interconnecting the said signalling means subject to each of said control means to make the other signal means inoperative by the prior operation of one of the control means, and means located at another station connected with the multiple choice selection means to limit the effectiveness of selection of the multiple choice selection means and the operation of the control means comprising inactivating means for said controlling means for the interconnecting means of said first signalling means.

2. In a game scoring device for judging contestants' answers to multiple choice questions in point of time, which includes in combination a plurality of signalling means comprising lamps, lamp circuits for the same, a plurality of parallel circuits for said lamps having manually operable independent switching means and a correspondingly numbered manually controllable switching means for predeterminedly closing said lamp circuits, and including a relay circuit in parallelism with said lamp circuit whereby the actuation of one lamp circuit will open the other lamp circuits.

3. In a game scoring device for judging contestants' answers to multiple choice questions in point of time as well as accuracy, including in combination a plurality of banks of switching means which are under manual control, each switching bank being connected in parallel with the other, relay means in each circuit controlling contacts for opening the other lamp circuits and means to control the selection of any one of the switches in each bank, comprising switching means for selectively connecting any one of the parallel circuits.

4. In a game scoring device for judging contestants' answers to multiple choice questions in point of time as well as accuracy, the combination which includes a plurality of banks of switching means which are under manual control, each switching bank being connected in parallel with the other, relay means in each circuit controlling contacts for opening the other lamp circuits and means to control the selection of any one of the switches in each bank, comprising switching means for selectively connecting any one of the parallel circuits comprising manual means.

5. In a game scoring device for judging contestants' answers to multiple choice questions in point of time as well as accuracy, the combination which includes a plurality of banks of switching means which are under manual control, each switching bank being connected in parallel with the other, relay means in each circuit controlling contacts for opening the other lamp circuits and means to control the selection of any one of the switches in each bank, comprising switching means for selectively connecting any one of the parallel circuits comprising a cooperating plate and contacts and including a scoring card having a predetermined spacial shorting section.

RICHARD H. DORF.

REFERENCES CITED

The following references are of record in the file of this patent:

UNITED STATES PATENTS

| Number | Name | Date |
|---|---|---|
| 1,153,737 | Van der Hoorn et al., | Sept. 14, 1915 |
| 2,050,805 | Pumar | Aug. 11, 1936 |
| 2,104,718 | Dougherty | Jan. 4, 1938 |

FOREIGN PATENTS

| Number | Country | Date |
|---|---|---|
| 45,507 | Austria | Jan. 10, 1911 |